(12) United States Patent
Odawara

(10) Patent No.: US 8,564,671 B2
(45) Date of Patent: Oct. 22, 2013

(54) TELEVISION CAMERA AND TELEVISION CAMERA CONTROL SYSTEM

(75) Inventor: Muneaki Odawara, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 12 days.

(21) Appl. No.: 13/378,414

(22) PCT Filed: Jun. 16, 2010

(86) PCT No.: PCT/JP2010/004003
§ 371 (c)(1),
(2), (4) Date: Dec. 15, 2011

(87) PCT Pub. No.: WO2010/146851
PCT Pub. Date: Dec. 23, 2010

(65) Prior Publication Data
US 2012/0092505 A1    Apr. 19, 2012

(30) Foreign Application Priority Data
Jun. 19, 2009  (JP) ................................. 2009-146436

(51) Int. Cl.
*H04N 17/00* (2006.01)
*H04N 17/02* (2006.01)

(52) U.S. Cl.
USPC ........................................ 348/188; 348/223.1

(58) Field of Classification Search
USPC .............. 348/176, 223.1, 263, 188, 255, 630, 348/645, 646, 649, 655, 656, 659, 671–675, 348/678–680

IPC .............................................. H04N 17/00,17/02
See application file for complete search history.

(56) References Cited

U.S. PATENT DOCUMENTS

| 4,506,287 A | 3/1985 | Yamanaka et al. |
| 4,608,593 A * | 8/1986 | Miyaji et al. ................... 348/263 |
| 4,626,893 A * | 12/1986 | Yamanaka ..................... 348/176 |
| 2006/0268119 A1* | 11/2006 | Sugawara .................. 348/223.1 |

FOREIGN PATENT DOCUMENTS

| CA | 1189955 | 7/1985 |
| JP | 58-020092 | 2/1983 |
| JP | 58-20092 | 2/1983 |
| JP | 6-311419 | 11/1994 |
| JP | 2008-206090 | * 4/2008 |
| JP | 2008-206090 | 9/2008 |

OTHER PUBLICATIONS

JP Office Action for Japanese Application No. 2009-146436, issued on Sep. 11, 2012.

* cited by examiner

*Primary Examiner* — Trang U Tran
(74) *Attorney, Agent, or Firm* — Antonelli, Terry, Stout & Kraus, LLP.

(57) ABSTRACT

Provided is a television camera using a solid-state imaging device, wherein color signal adjustment between TV cameras can be performed easily and quickly without relying on the level of skill of an operator. The serial digital signal of a TV camera (a master) acting as the standard for color signal adjustment is directly input into another TV camera (a slave) that adjusts the color signal, and the image level of each channel of the slave is automatically adjusted in a manner such that the image level of each channel of the master corresponds with that of the slave.

2 Claims, 14 Drawing Sheets

TELEVISION CAMERA AND TELEVISION CAMERA CONTROL SYSTEM

FIELD

The present invention relates to a color signal adjustment method between television cameras.

BACKGROUND

In a studio in a broadcast station, for example, plural television cameras (hereinafter referred to as TV camera) are simultaneously used upon producing a single broadcast program. When plural TV cameras are used, it is important that there is no color misregistration among respective TV cameras.

When a color misregistration is caused between a TV camera A and a TV camera B, and with this state, an image is switched from an image acquired by the TV camera A to an image acquired by the TV camera B, a color in the image that is on air might be changed, resulting in that a viewer might have a feeling of strangeness.

In order to eliminate the color misregistration among the respective TV cameras, a reference chart (grayscale chart, color chart, etc.) is simultaneously photographed by the plural TV cameras, when plural TV cameras are used in a TV production of a broadcast program. During the simultaneous photographing, an adjustment operation is performed in such a manner that image levels of R (red), G (green), and B (blue) channels are equal among the respective TV cameras.

However, this adjustment method has drawbacks (1) and (2) described below.
(1) Since the TV cameras are manually adjusted one by one, the adjustment operation takes much time, as there are many TV cameras that are used.
(2) This operation is a significant operation for determining a "picture" of the broadcast program that is to be produced. Therefore, only a skilled operator with much knowledge about a creation of the picture of the broadcast program can do this operation.

CITATION LIST

Patent Literature

[Patent Literature 1] Japanese Patent Application Laid-Open Publication No. 6-311419

SUMMARY OF INVENTION

Technical Problem

There has conventionally been known a TV camera control apparatus configured to include a unit in which, in order to confirm whether or not an adjustment state of a TV camera that is defined as a reference and an adjustment state of another TV camera that is under adjustment become equal to each other, video signals of these TV cameras are automatically changed into high-speed signals, and these signals are displayed as being superimposed. For example, Patent Literature 1 describes a technique of a central control apparatus of a TV camera. However, the control apparatus described in Patent Literature 1 does not consider a setting, management, and reuse of various set values (control parameters) of the TV cameras. In particular, the Patent Literature 1 does not solve a problem of a complicated setting operation for the individual camera, the complicated setting operation being caused because the number of the set values increases.

The present invention aims to easily and quickly perform a color signal adjustment among TV cameras without relying on the level of skill of an operator.

Solution to Problem

In order to address the above-mentioned problem, a television camera according to the present invention performs spectroscopy to a subject image that is incident through a lens unit, and irradiates the resultant to a solid-state imaging device so as to convert the resultant to a video signal, wherein a video signal, which is formed by multiplexing signals of each of red, green, and blue channels, is inputted, the signals being subject to a color signal adjustment, and the color signal adjustment is performed to agree with the value of the inputted video signal.

Preferably, the television camera photographs a reference chart, which is photographed by the television camera that is defined as the reference for the color signal adjustment for performing the color signal adjustment, simultaneous with the television camera, and performs the color signal adjustment to agree with the value of the inputted video signal. More preferably, predetermined plural reference areas are formed on the reference chart, wherein the photographed position of the area is adjusted to agree with a position of a predetermined marker, whereby a field angle is adjusted such that the field angle agrees with the field angle of the television camera, which is defined as the reference for the color signal adjustment, and then, the color signal adjustment is performed.

More preferably, the television camera inputs the video signal, which is formed by multiplexing the signals of each of red, green, and blue channels, the signals being subject to the color signal adjustment, from the television camera that is defined as the reference for the color signal adjustment in the form of HD-SDI (High Definition Television-Serial Digital Interface).

A television camera control system according to the present invention includes a first television camera that photographs a reference chart, adjusts a field angle to a predetermined field angle, and adjusts a black level, a white level (gain level), a flare level, a gamma (γ) level, and a color difference matrix; a transmission line; and a second television camera that photographs the reference chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, and a color difference matrix.

Preferably, when the first television camera is used in combination with a camera control apparatus, the video signal inputted to the second television camera through the transmission line is a return signal of a camera control apparatus of the first television camera.

Preferably, the transmission line is an HD-SDI (High Definition Television-Serial Digital Interface) signal.

A television camera control system according to the present invention, which is not the television camera control system of the above invention, includes a first television camera that photographs a reference chart, adjusts a field angle to a predetermined field angle, and adjusts a black level, a white level (gain level), a flare level, a gamma (γ) level, a knee, and a color difference matrix; a transmission line; and a second television camera that photographs the reference chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, a knee, and a color difference matrix.

Preferably, when the first television camera is used in combination with a camera control apparatus, the video signal inputted to the second television camera through the transmission line is a return signal of a camera control apparatus of the first television camera.

Preferably, the transmission line is an HD-SDI (High Definition Television-Serial Digital Interface) signal.

Advantageous Effects of Invention

According to the present invention, a time taken for a color registration among TV cameras can remarkably be shortened. Further, a degree of variation in the color signal adjustment among TV cameras due to the automation in the adjustment can be reduced. Moreover, the color signal adjustment among the TV cameras can easily and quickly be performed without relying on the level of skill of an operator.

DESCRIPTION OF EMBODIMENTS

The presents invention directly inputs a serial digital signal (hereinafter referred to as SDI (Serial Digital Interface) signal in the present specification) of a TV camera (master), which is defined as a reference for a color signal adjustment, into another camera (hereinafter referred to as a slave in the present specification) that performs a color signal adjustment, and automatically adjusts an image level of each channel of the slave in order that an image level of a video signal of each channel of the master and the image level of each channel of the slave agree with each other.

In the present invention, when a TV camera and a camera control apparatus (hereinafter referred to as a CCU (Camera Control Unit) in the present specification) are used in combination, a color signal adjustment reference signal of the master is inputted to a return video signal (hereinafter referred to as a RET signal in the present specification) that is from the CCU to the TV camera, whereby the image level of each channel of the slave is automatically adjusted in such a manner that the image level of each channel of the master and the image level of each channel of the slave agree with each other.

Embodiments of the present invention will be described below in detail with reference to the attached drawings. In the description of the drawings, the components having the same function are identified by the same numerals in order to avoid the repeated description as much as possible.

An operation of a color adjustment of plural TV cameras used in a studio such as a broadcast station will be described with reference to FIG. 1.

Figure 1:
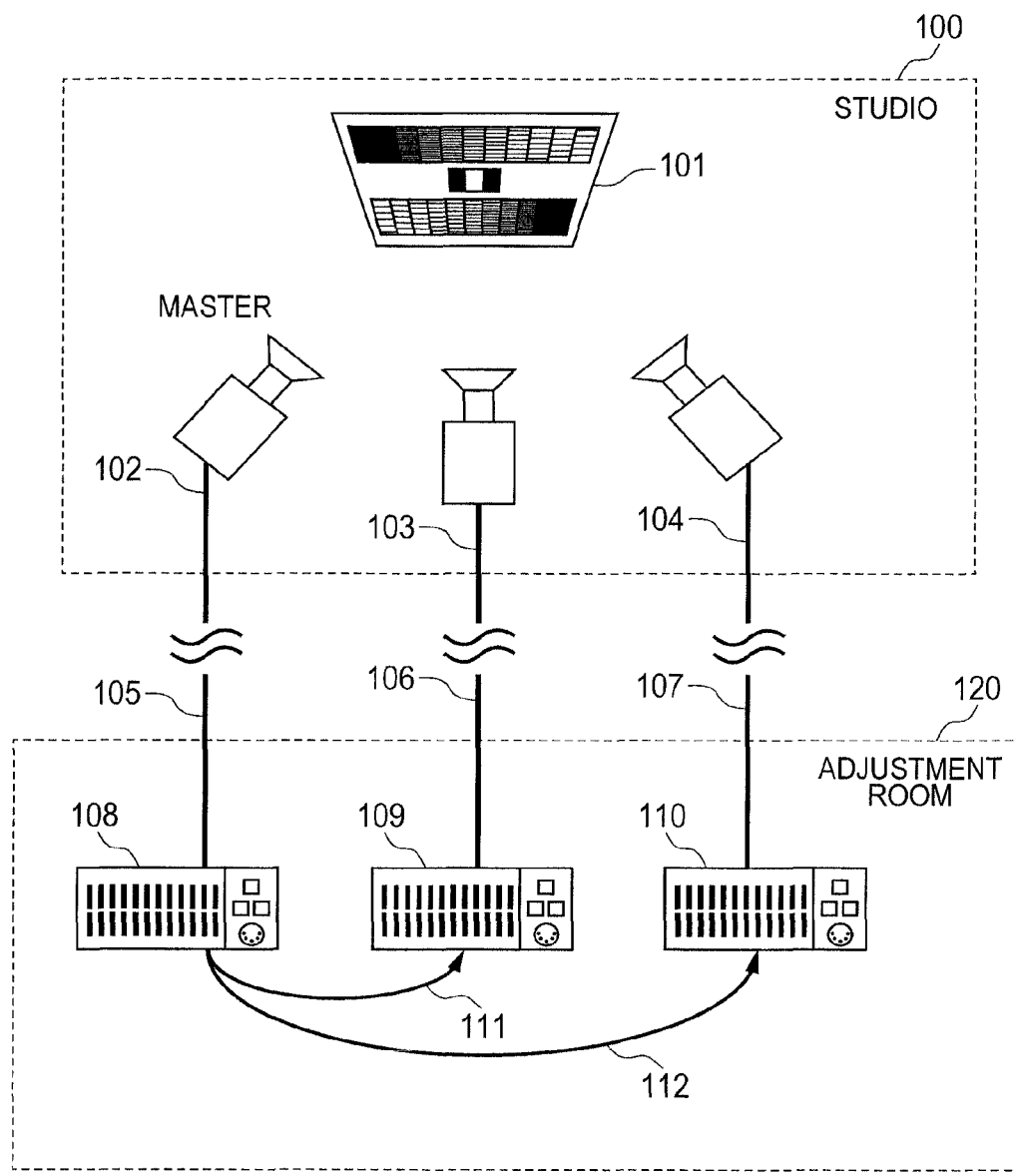
FIG. 1 is a block diagram illustrating a configuration of a TV camera control system according to one embodiment, when a color signal adjustment operation according to the present invention is performed.

FIG. 1 is a block diagram illustrating a configuration of a TV camera control system according to one embodiment, when the color adjustment operation of the present invention is executed. Numeral 100 is a studio, and 120 is an adjustment room. In the studio 100, numeral 101 is a grayscale chart that is one of reference charts (standard subject), and 102 and 103 are TV cameras. Numeral 102 is a master, while 103 and 104 are slaves. In the adjustment room 120, numerals 108, 109, and 110 are CCUs, wherein the CCU 108 is a master CCU (hereinafter referred to as MCCU) connected to the master 102, numeral 111 is a transmission line linking the MCCU 108 and the CCU 109, and numeral 112 is a transmission line linking the MCCU 108 and the CCU 110. Numerals 105 is a transmission line linking the master 102 and the MCCU 108, numeral 107 is a transmission line linking the slave 103 and the CCU 109, and numeral 107 is a transmission line linking the slave 104 and the CCU 110. The transmission lines 105, 106, 111, and 112 are coaxial cables, for example. Alternatively, the transmission lines 105, 106, 111, and 112 are LAN (Local Area Network) cables, for example.

Firstly, in FIG. 1, the master 102, the slave 103, and the slave 104 simultaneously photograph the grayscale chart 101, and adjust a field angle with a marker being defined as a reference (described later).

After adjusting the field angle, the master 102 adjusts a black level, a gain level (white level), flare level, gamma level, a color difference matrix, and the like to predetermined respective set values with respect to a video signal of the photographed grayscale and with respect to a video signal in a marker area. The master 102 outputs the color adjustment reference signal, which has been adjusted, to the MCCU 108 through the transmission line 105. The MCCU 108 sends a return signal (a signal of return) to the master 102 from the inputted video signal, and outputs the return signal to the CCU 109 of the slave 103 and to the CCU 110 of the slave 104 through the transmission lines 111 and 112.

After adjusting the field angle of the photographed video image of the grayscale, the slaves 103 and 104 also compare the return signal transmitted from the master 102 from the MCCU 108 and the signal level of the video signal of the slaves 103 and 104, and adjust the video image level of each channel such that the signal level of the video signal of the master 102 and the signal level of the video signal of the slaves 103 and 104 agree with each other.

Specifically, the slave 103 separates the video signal inputted from the MCCU 108 through the CCU 109 and the video signal photographed by the slave 103 into predetermined various set value data (black level, white level, flare level, gamma level, color-difference matrix, etc.) with the video signal in an area of a marker.

The slave 103 adjusts the signal level of each video signal in order that each of the separated various set value data becomes the same or close to the data value inputted from the MCCU 108.

The same process is performed for the CCU 110 of the slave 104.

In the embodiment in FIG. 1, slaves are two. However, the slave may be only one, and the number of the slaves is not particularly limited.

The video signal compared and adjusted by the slave 103 is a video signal in the area in the marker used for the field angle adjustment. Therefore, the video signal transmitted from the MCCU 108 to the slave 103 through the CCU 103 may be only the video signal in the area in the marker used for the field angle adjustment.

In FIG. 1, a coaxial cable is used, for example, for the transmission lines 105 to 107 that link the TV cameras (master 102, and the slaves 103 and 104) and the MCCU 108, and the CCUs 109 and 110.

In general, the camera control apparatus such as the MCCU 108, the CCU 109, and the CCU 110 has plural input/output terminals of HD-SDI signal, SD-SDI signal (Standard Definition-Serial Digital Interface: standard definition) signal, or VBS (Video Burst Signal).

Accordingly, any video signal may be inputted to the video input terminal of the camera control apparatus connected to the TV camera for performing the color signal adjustment. However, the HD-SDI signal is desirable from the viewpoint of resolution.

When the SD-SDI signal or the VBS signal is inputted to the video signal input terminal, the transmission signal from the camera control apparatus to the TV camera undergoes up-conversion for the HD-SDI signal, whereby the transmission signal is converted into the HD-SDI signal, and then, transmitted.

Similarly, the coaxial cable is used, for example, for the transmission lines 111 and 112 for outputting the video signal, outputted from the MCCU 108, to the CCU 109 and the CCU 110.

Figure 2:
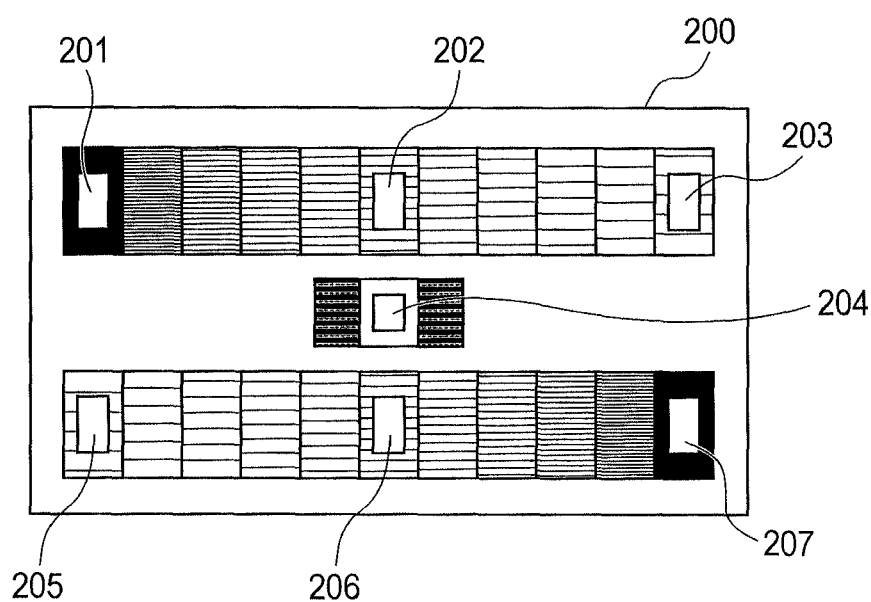
FIG. 2 is a view illustrating one example of a grayscale chart.

FIG. 2 is a view illustrating one example of the grayscale chart 101. Numeral 200 is a displayed image displayed onto the display unit such as the viewfinder, while numerals 201 to 207 are markers.

The TV camera control system for performing the color signal adjustment operation described with reference to FIG. 1 firstly photographs the grayscale chart 101.

The field angle of the image of the photographed grayscale is adjusted by an operator in order that the frame-like markers 201 to 207, which are superimposed on the output signal from the video display apparatus called the viewfinder and the TV camera, and which are used for the field angle adjustment, are superimposed on the specific portion of the reference chart. The markers 201 to 207 for the field angle adjustment are superimposed only on the picture output from the video display apparatus or the CCU (and MCCU), and not superimposed on the main line signal. The signal level of the video signal on the area in the markers 201 to 207 is detected, and a later-described video detection process is executed.

Figure 3:
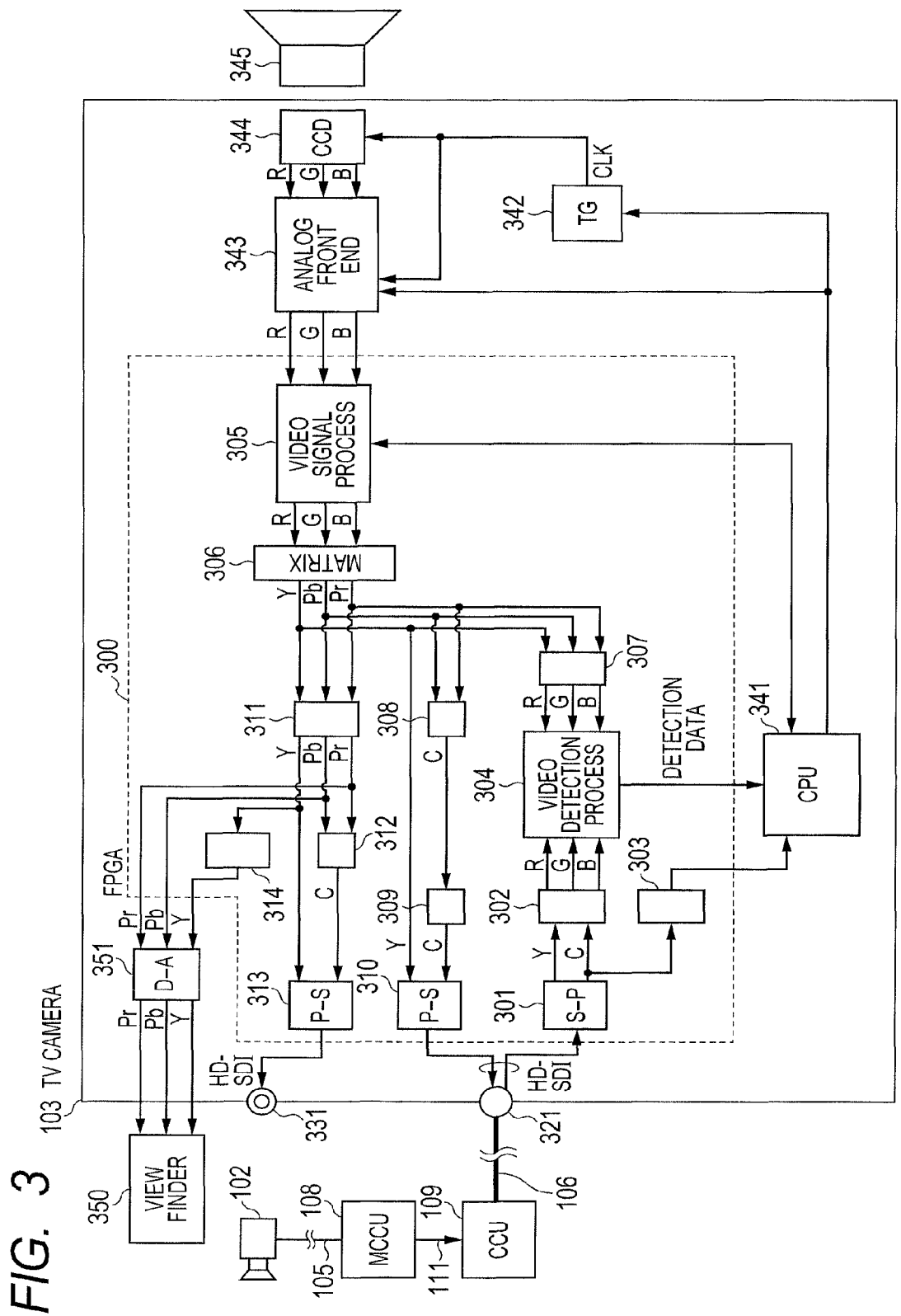
FIG. 3 is a block diagram illustrating a system configuration for describing the TV camera control system according to one embodiment of the present invention.

The process for the video signal inputted to the TV camera (slave) will be described with reference to FIG. 3. FIG. 3 is a block diagram illustrating a system configuration for describing the TV camera control system according to one embodiment of the present invention. FIG. 3 is a block diagram illustrating in detail the configuration of the slave, in particular.

Numeral 300 is an FPGA (Field Programmable Gate Array) of the slave 103, numeral 321 is an input/output terminal for connecting the transmission line 106 that is coupled to the CCU 109, numeral 331 is an HD-SDI signal output terminal, numeral 341 is a CPU (Central Processing Unit), numeral 342 is a timing generator (TG), numeral 343 is an analog front end that performs a pre-process (noise elimination, level adjustment, A-D conversion, etc.) to an electric signal inputted from the CCD 344 and outputs a digital video signal to a video signal processing unit 305 of the FPGA 300, numeral 345 is a lens unit, numeral 344 is a CCD (Charge Coupled Device) that converts a subject image (reference chart), which passes through the lens unit 345 to be incident, into an electric signal, and outputs the resultant, numeral 350 is the viewfinder, and numeral 351 is a D-A converter (D-A) that converts a blue color difference (Pb) signal and a red color difference (Pr) signal inputted from a marker superimposition unit 311 and a brightness (Y) signal inputted from a three-value synchronized mixing unit 314 into digital data, and outputs the resultant to the viewfinder 350.

In the FPGA 300, numeral 301 is a serial-parallel converter (S-P), numeral 302 is a decoder, numeral 303 is a data separation unit, numeral 304 is a video detection processing unit, numeral 305 is the video signal processing unit, numeral 306 is a matrix unit, numeral 307 is a decoder, numeral 308 is a color signal generating unit, numeral 309 is a CPU data superimposition unit, numeral 310 is a parallel-serial converter (P-S), numeral 312 is a color signal generating unit, numeral 313 is a parallel-serial converter (P-S), and numeral 314 is the three-value synchronized mixing unit.

For simplifying the description, the slave 104, the CCU 110, the transmission line 107, and the transmission line 112, illustrated in FIG. 1, are not illustrated in the system configuration in FIG. 3.

In FIG. 3, the master 102 and the MCCU 108 are coupled with the transmission line 105, the slave 103 and the CCU 109 are coupled with the transmission line 106, and the MCCU 108 and the CCU 109 are coupled with the transmission line 111.

As in FIG. 1, the master 102 and the slave 103 firstly photograph the grayscale chart 101 simultaneously, and then, adjust the field angle. After the adjustment of the field angle, the master 102 adjusts the black level, the white level, the gain level, the flare level, the gamma level, and the color-difference adjustment matrix, etc. to the predetermined set values based upon the video signal in the area in the marker of the image of the photographed grayscale. The adjusted video signal is outputted to the MCCU 108 via the transmission line 105. The MCCU 108 outputs the inputted video signal, which has already been adjusted, to the slave 103 through the transmission line 111, the CCU 109, and the transmission line 106. The slave 103 also adjusts the field angle with the image of the grayscale, which is photographed simultaneously with the master 102, and after the field angle adjustment, the slave 103 performs the color signal adjustment in order that the signal level of the video signal inputted from the master 102 and the signal level of the image photographed by the TV camera of the slave 103 agree with each other.

The video signal that is compared and adjusted by the slave 103 is the video signal in the area in the marker used upon the field angle adjustment. Therefore, the video signal transmitted to the slave 103 from the MCCU 108 via the CCU 103 may only be the video signal in the area in the marker used for the field angle adjustment.

Specifically, in FIG. 3, the video signal outputted from the master 103 is transmitted to the FPGA 300 of the slave 103 through the transmission line 111, the CCU 109, the transmission line 106, and the input/output terminal 321. The transmitted video signal is, for example, an HD-SDI signal.

The video signal inputted to the FPGA 300 is inputted to the serial-parallel converter 301. The serial-parallel converter 301 converts the received HD-SDI signal from the serial signal into the parallel signal, and outputs the brightness signal and the color signal to the decoder 302, while outputs the color signal to the data separation unit 303.

The decoder 302 generates a red signal, green signal, and blue signal from the brightness signal and the color signal, and then, outputs the resultant to the video detection processing unit 304.

The data separation unit 303 separates the various set values (black level, gain level, flare level, gamma level, masking, etc.) of the master 102 superimposed on the inputted color signal, and outputs the resultant to the CPU 341.

The CPU 341 sets the data of the FPGA 300, the analog front end 343, and the timing generator 342 in order that the various set values of the slave 103 agree with the data pieces inputted from the master 102.

According to the setting described above, various set values such as the black level, the white level (gain level), the flare level, the gamma level, the color-difference matrix, and etc. of the master 102 and those of the slave 103 become equal to each other.

After the setting described above is completed, a fine adjustment process of the various set values of the slave 103 is executed. The fine adjustment process is executed for absorbing an error generated due to the variation in the performance of an electronic circuit component such as an IC used for an individual TV camera.

Specifically, in FIG. 3, the reference chart (the subject image that is to become the reference) 101 (see FIGS. 1 and 2) is incident on the CCD 344, simultaneous with the master 102, through the lens unit 345, wherein the CCD 344 converts the incident light into electrical signals of red, green, and blue, respectively, and outputs the resultant to the analog front end 343. The analog front end 343 performs a pre-process to each of the inputted electric signals of red, green, and blue, and outputs the red signal, green signal, and blue signal to the video signal 305 of the FPGA 300.

The CPU 341 controls the analog front end 343, the timing generator 342, and the FPGA 300 in accordance with a predetermined software. The timing generator 342 generates a predetermined clock signal (CLK) so as to allow the process timings of the CCD 344 and the analog front end 343 to be synchronized with each other.

The video signal processing unit 305 performs a gamma level correction, DTL correction, knee correction, masking correction, black offset, white clip, and other video signal processes for each of red, green and blue of the video signal inputted from the analog front end 343, and outputs the red signal, green signal, and blue signal to the matrix unit 306.

The matrix unit 306 performs a matrix process to the inputted red signal, green signal, and blue signal so as to output the brightness (Y) signal, blue color difference (Pb) signal, and red color difference (Pr) signal.

Specifically, the matrix unit 306 outputs the brightness signal, the blue color difference signal, and the red color difference signal to the marker superimposition unit 311, and outputs the same to the decoder 307.

The matrix unit 306 also outputs the brightness signal to the parallel-serial converter 310, and outputs the blue color difference signal and the red color difference signal to the color signal generating unit 308.

The color signal generating unit 308 generates a color signal from the inputted blue color difference signal and the red color difference signal, and outputs the resultant to the CPU data superimposition unit 309.

The CPU data superimposition unit 309 superimposes the CPU data on the inputted color signal, and outputs the resultant to the parallel-serial converter 310.

The parallel-serial converter 310 converts the inputted brightness signal and the color signal into the HD-SDI signal of the serial data, and outputs the resultant to the CCU 109 through the HD-SDI input/output terminal 321 and the transmission line 106.

The marker superimposition unit 311 superimposes the marker illustrated in FIG. 2 on the inputted brightness signal, the blue color difference signal, and the red color difference signal, and outputs the brightness signal on which the marker is superimposed to the parallel-serial converter 313 and the matrix unit 314. The marker superimposition unit 311 also outputs the blue color difference signal and the red color difference signal, on which the marker is superimposed, to the color signal generating unit 312 and the D-A converter 351.

The color signal generating unit 312 generates a color signal based upon the inputted blue color difference signal and the red color difference signal, and outputs the resultant to the parallel-serial converter 313.

The parallel-serial converter 313 converts the inputted brightness signal and the color signal into the HD-SDI signal of the serial data, and outputs the resultant to the HD-SDI output terminal 331.

The three-value synchronized mixing unit 314 adds a composite synchronizing signal during a blanking interval of the inputted color signal, and outputs the resultant to the D-A converter 351.

The D-A converter 351 converts the inputted brightness signal, the blue color difference signal, and the red color difference signal into an analog signal, and outputs the resultant to the viewfinder 350.

The viewfinder 350 generates a video signal based upon the inputted brightness signal, the blue color difference signal, and the red color difference signal, and displays the resultant.

The viewfinder 350 is also used for adjusting a field angle as described with reference to FIGS. 1 and 2. For example, when the TV camera such as the master 102 or the slave 102 photographs the reference chart such as the grayscale chart 101 for adjusting the field angle, the marker superimposition unit 311 superimposes the marker on the image of the photographed reference chart, and the resultant is displayed, whereby an operator can adjust the field angle.

The fine adjustment process will next be described.

Not only the video signal from the master 102 but also the video signal of the image on the main line of the slave 103 (TV camera) are inputted to the video detection processing unit 304 from the decoder 307.

The video detection processing unit 304 firstly performs the fine adjustment process of the black level, the gain level (white level), the flare level, and the gamma level based upon the video signal, which is the result of photographing the grayscale chart 101, in accordance with the block diagram in FIG. 3 and the flowcharts illustrated in FIGS. 4 to 8. After the adjustment, it performs the fine adjustment process for the masking based upon the video signal that is the result of photographing the color chart.

Figure 4:
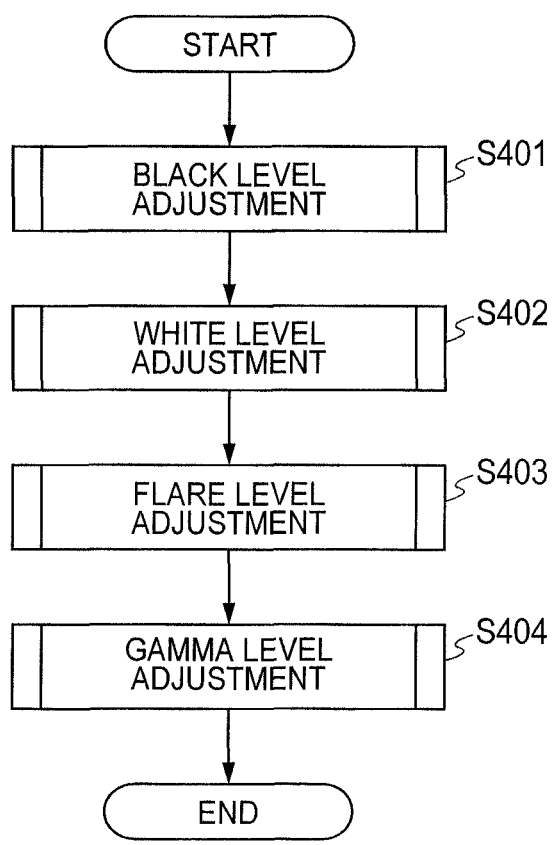
FIG. 4 is a flowchart illustrating a procedure when a black level, a gain level, a flare level, and a gamma level are adjusted according to one embodiment of the present invention.

FIG. 4 is a flowchart illustrating a procedure according to one embodiment, when the video detection processing unit 304 of the slave adjusts a black level, gain level (white level), a flare level, and a gamma level. The items adjusted with the use of the grayscale chart 101 defined as the reference chart include the above-mentioned five items excluding the masking.

In the processes for the above-mentioned five items, the level of the video signal of the master 102 is firstly detected, and a subtraction is made between the detected level and the level of the main line signal. Thereafter, the result of the subtraction that becomes less than a threshold value means that the fine adjustment for this item is completed.

In FIG. 4, the master 102 and the slave 103 simultaneously photograph the same grayscale chart 101 so as to acquire the photographed signals as the video signals of the main line, and then, the field angle is adjusted, as described with reference to FIGS. 1 to 3. Next, the master 102 executes the black level correction, the white level (gain level) correction, the flare level correction, and the gamma level correction, and outputs the resultant to the FPGA 300 (video detection processing unit 304) of the slave 103 through the transmission line 105, the MCCU 108, the transmission line 111, the CCU 109, the transmission line 106, and the input/output terminal 321.

The color signal adjustment according to the present invention is executed by using the video signal in the area of the markers 201 to 207 upon the adjustment of the field angle.

The video detection processing unit 304 of the FPGA 300 performs the black level adjustment in step S401, and performs the white level (gain level) adjustment in step S402. It also performs the flare level adjustment in step S403, and performs the gamma level adjustment in step S404.

The steps S401 to S404 in FIG. 4 will be described in more detail with reference to FIGS. 5 to 8.

Figure 5:
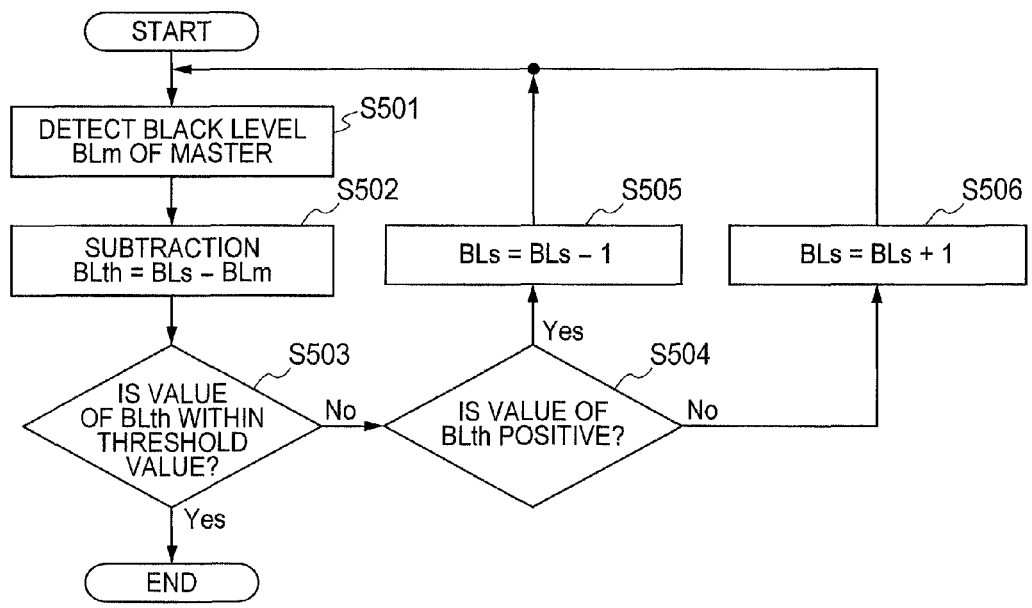
FIG. 5 is a flowchart illustrating a procedure when the black level is adjusted according to one embodiment of the present invention.

The operation of the black level adjustment in step S401 in FIG. 4 will be described in more detail with reference to FIG. 5. FIG. 5 is a flowchart illustrating the procedure when the black level is adjusted according to one embodiment of the present invention.

In step S501, a black level value BLm of the video signal of the master 102 inputted to the FPGA 300 from the input/output terminal 321 is detected, and then, the process proceeds to step S502.

In step S502, the black level value BLm of the video signal of the master 102 is subtracted from a black level value BLs of the video signal inputted from the decoder 307 of the slave 103 so as to calculate a subtracted value BLth, and then, the process proceeds to step S503.

In step S503, it is determined whether the subtracted value BLth falls within a predetermined threshold value for the black level or not. When it is determined that the subtracted value BLth falls within the predetermined threshold value, the black level adjustment is ended, and then, the process proceeds to step S402 in FIG. 4. When it is determined that the subtracted value BLth is outside the predetermined threshold value, the process proceeds to step S504.

In step S504, it is determined whether the subtracted value BLth is positive or negative. When the subtracted value BLth is positive, the process proceeds to step S505. When the subtracted value is negative, the process proceeds to step S506.

In step S505, 1 is subtracted from the black level value BLs of the slave 103 (BLs=BLs−1), and then, the process returns to step S501.

In step S506, 1 is added to the black level value BLs of the slave 103 (BLs=BLs+1), and then, the process returns to step S501.

Figure 6:
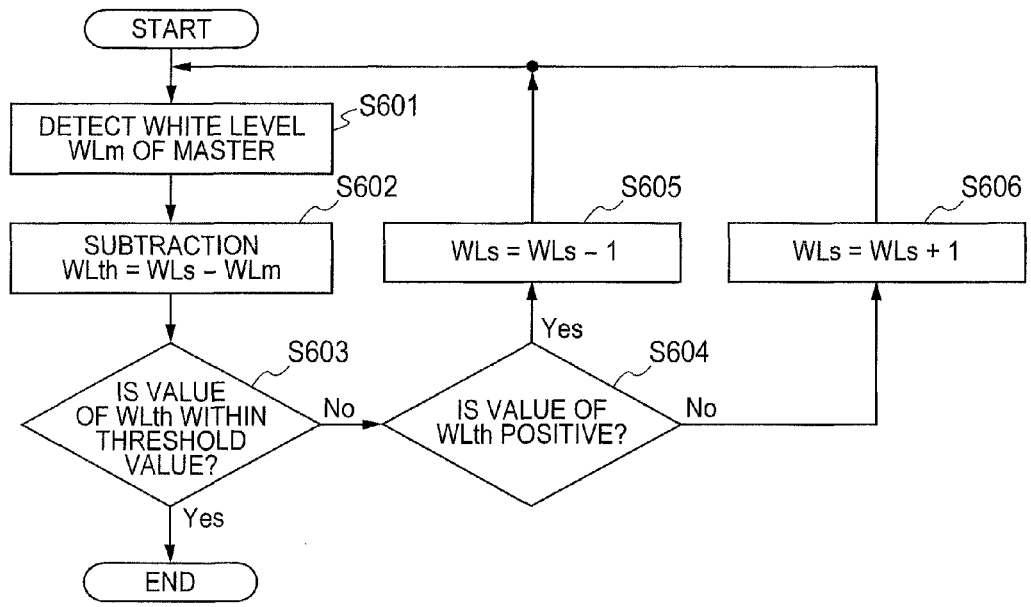
FIG. 6 is a flowchart illustrating a procedure when the white level is adjusted according to one embodiment of the present invention.

The operation of the white level (gain level) adjustment in step S402 in FIG. 4 will be described in more detail with reference to FIG. 6. FIG. 6 is a flowchart illustrating the procedure when the white level is adjusted according to one embodiment of the present invention.

In step S601, a white level value WLm of the video signal of the master 102 inputted to the FPGA 300 from the input/output terminal 321 is detected, and then, the process proceeds to step S602.

In step S602, the white level value WLm of the video signal of the master 102 is subtracted from a white level value WLs of the video signal inputted from the decoder 307 of the slave 103 so as to calculate a subtracted value WLth, and then, the process proceeds to step S603.

In step S603, it is determined whether the subtracted value WLth falls within a predetermined threshold value for the white level or not. When it is determined that the subtracted value WLth falls within the predetermined threshold value, the white level adjustment is ended, and then, the process proceeds to step S403 in FIG. 4. When it is determined that the subtracted value WLth is outside the predetermined threshold value, the process proceeds to step S604.

In step S604, it is determined whether the subtracted value WLth is positive or negative. When the subtracted value WLth is positive, the process proceeds to step S605. When the subtracted value is negative, the process proceeds to step S606.

In step S605, 1 is subtracted from the white level value WLs of the slave 103 (WLs=WLs−1), and then, the process returns to step S601.

In step S606, 1 is added to the white level value WLs of the slave 103 (WLs=WLs+1), and then, the process returns to step S601.

Figure 7:
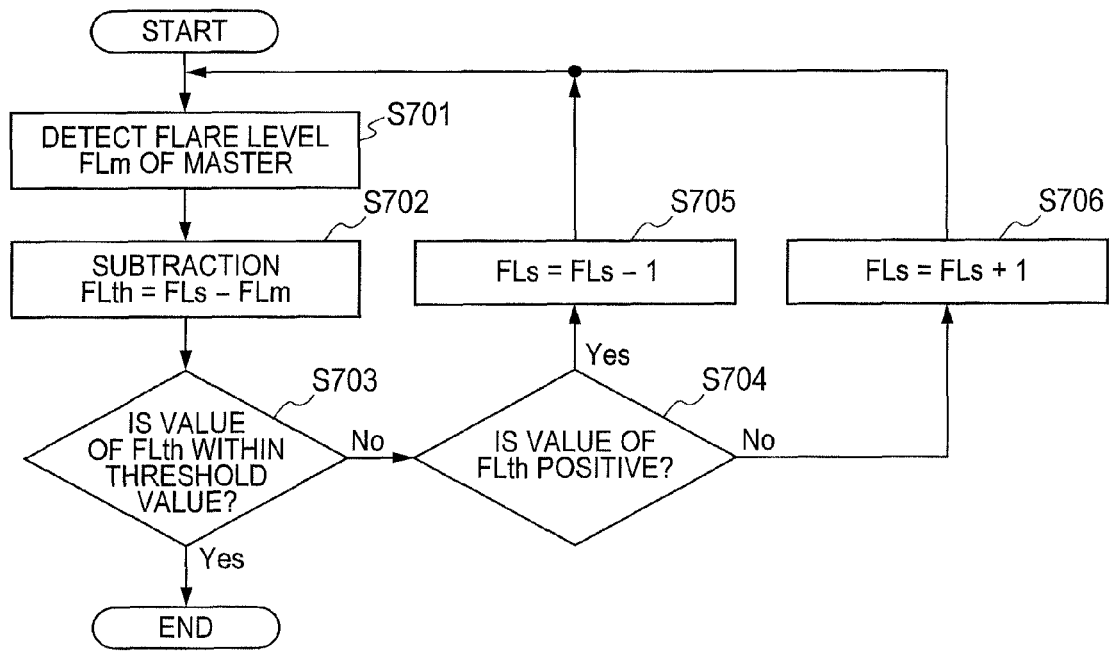
FIG. 7 is a flowchart illustrating a procedure when the flare level is adjusted according to one embodiment of the present invention.

The operation of the flare level adjustment in step S403 in FIG. 4 will be described in more detail with reference to FIG. 7. FIG. 7 is a flowchart illustrating the procedure when the flare level is adjusted according to one embodiment of the present invention.

In step S701, a flare level value FLm of the video signal of the master 102 inputted to the FPGA 300 from the input/output terminal 321 is detected, and then, the process proceeds to step S702.

In step S702, the flare level value FLm of the video signal of the master 102 is subtracted from a flare level value FLs of the video signal inputted from the decoder 307 of the slave 103 so as to calculate a subtracted value FLth, and then, the process proceeds to step S703.

In step S703, it is determined whether the subtracted value FLth falls within a predetermined threshold value for the flare level or not. When it is determined that the subtracted value FLth falls within the predetermined threshold value, the flare level adjustment is ended, and then, the process proceeds to step S404 in FIG. 4. When it is determined that the subtracted value FLth is outside the predetermined threshold value, the process proceeds to step S704.

In step S704, it is determined whether the subtracted value FLth is positive or negative. When the subtracted value FLth is positive, the process proceeds to step S705. When the subtracted value is negative, the process proceeds to step S706.

In step S705, 1 is subtracted from the flare level value FLs of the slave 103 (FLs=FLs−1), and then, the process returns to step S701.

In step S706, 1 is added to the flare level value FLs of the slave 103 (FLs=FLs+1), and then, the process returns to step S701.

Figure 8:
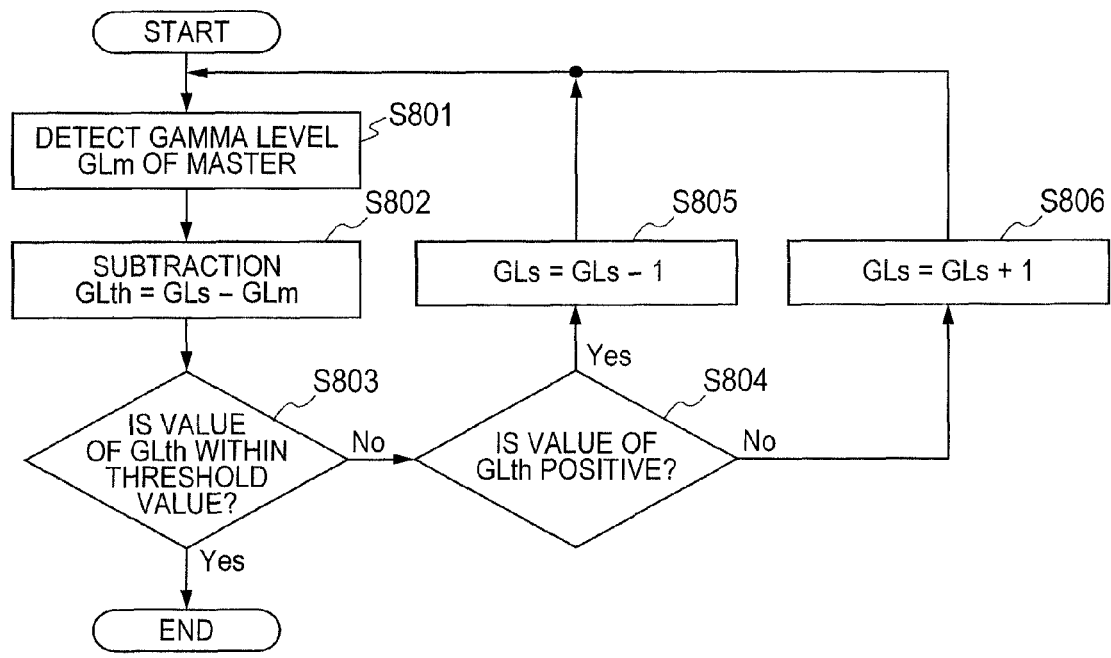
FIG. 8 is a flowchart illustrating a procedure when the gamma level is adjusted according to one embodiment of the present invention.
Figure 9:
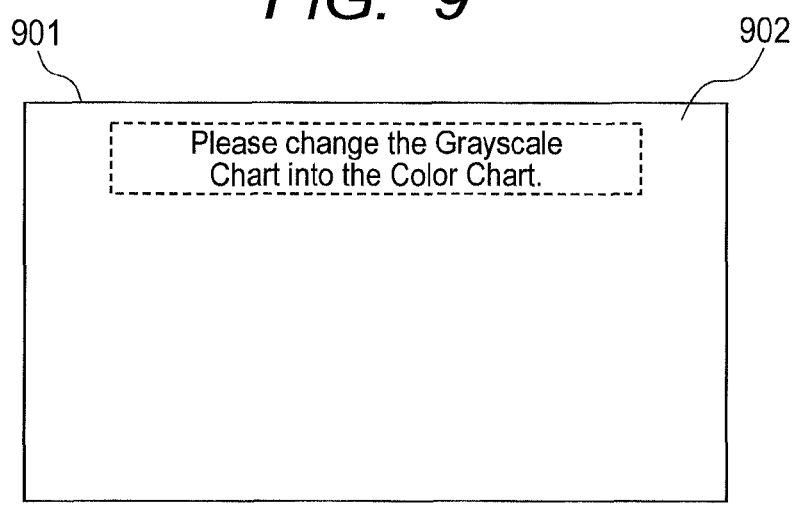
FIG. 9 is a view illustrating a display of a warning message according to one embodiment of the present invention.

The operation of the gamma level adjustment in step S404 in FIG. 4 will be described in more detail with reference to FIG. 8. FIG. 8 is a flowchart illustrating the procedure when the gamma level is adjusted according to one embodiment of the present invention.

In step S801, a gamma level value GLm of the video signal of the master 102 inputted to the FPGA 300 from the input/output terminal 321 is detected, and then, the process proceeds to step S802.

In step S802, the gamma level value GLm of the video signal of the master 102 is subtracted from a gamma level value GLs of the video signal inputted from the decoder 307 of the slave 103 so as to calculate a subtracted value GLth, and then, the process proceeds to step S803.

In step S803, it is determined whether the subtracted value GLth falls within a predetermined threshold value for the gamma level or not. When it is determined that the subtracted value GLth falls within the predetermined threshold value, the gamma level adjustment is ended, and then, the process in FIG. 4 is ended. When it is determined that the subtracted value GLth is outside the predetermined threshold value, the process proceeds to step S804.

In step S804, it is determined whether the subtracted value GLth is positive or negative. When the subtracted value GLth is positive, the process proceeds to step S805. When the subtracted value is negative, the process proceeds to step S806.

In step S805, 1 is subtracted from the gamma level value GLs of the slave 103 (GLs=GLs−1), and then, the process returns to step S801.

In step S806, 1 is added to the gamma level value GLs of the slave 103 (GLs=GLs+1), and then, the process returns to step S801.

After the fine adjustment process (black level, gain level, flare level, gamma level) using the grayscale chart 101 as the reference chart according to the embodiment in FIGS. 1 to 8, an automatic adjustment of a masking parameter is executed. Therefore, the reference chart has to be changed to a color chart.

During the fine adjustment of the black level, the gain level, the flare level, and the gamma level, the TV camera photographs the grayscale chart 101 as the reference chart, and the video image of the photographed grayscale chart 101 is displayed on the viewfinder 350 as illustrated in FIG. 2.

When the fine adjustment of the black level, the gain level, the flare level, and the gamma level is ended, the video detection processing unit 304 outputs to the CPU 341 information indicating that the fine adjustment of the black level, gain level, flare level, and gamma level is ended, and allows the marker superimposition unit 311 to superimpose a warning message. As a result, the warning message such as "Please change the Grayscale chart into the Color Chart" is displayed as superimposed on the video image of the photographed grayscale chart 101.

Figure 10:
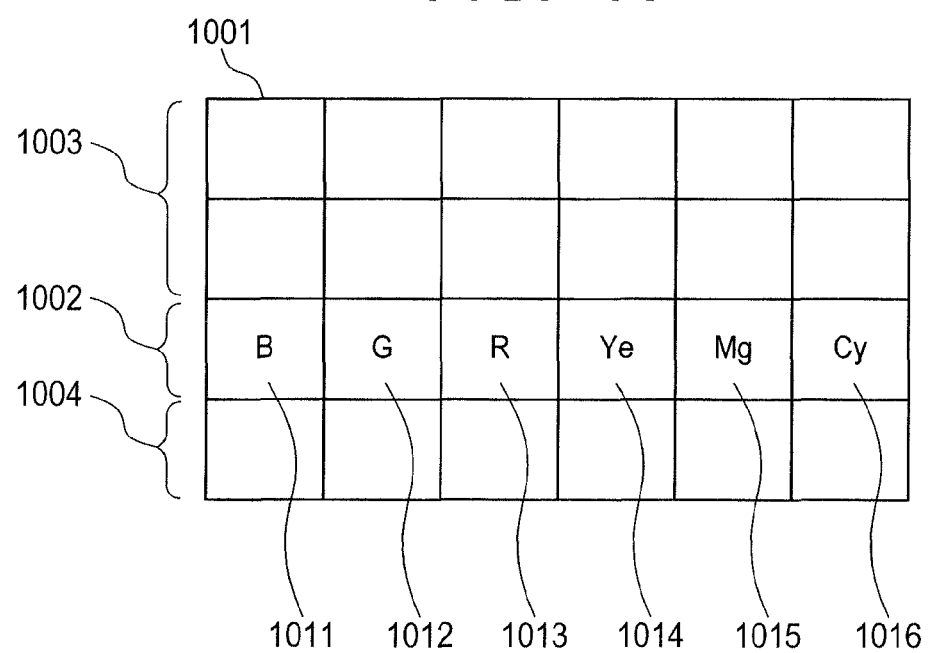
FIG. 10 is a view illustrating one example of a color chart according to one embodiment of the present invention.

When the warning message is displayed onto the viewfinder, the operator changes the reference chart in FIG. 1 to the color chart from the grayscale chart 101. FIG. 10 is a view illustrating one example of the color chart. Numeral 1001 is a displayed video image displayed onto the display unit such as the viewfinder.

The displayed video image 1001 is a chart including rectangle frames having the same shape and same area, wherein a different color is arranged in each frame. For example, two lines 1002 include intermediate colors, each having a different color. In a line 1003, three primary colors and their complementary colors, which are blue (B), green (G), red (R), yellow (Ye), magenta (Mg), cyan (Cy), are arranged. In a line 1004, the grayscale is arranged. Numeral 1011 is the blue (B), numeral 1012 is the green (G), numeral 1013 is the red (R), numeral 1014 is the yellow (Ye), numeral 1015 is the magenta (Mg), and numeral 1016 is the cyan (Cy). It is to be noted that the number of colors (the number of lines and columns), and the order of the arranged colors are optional.

Figure 11:
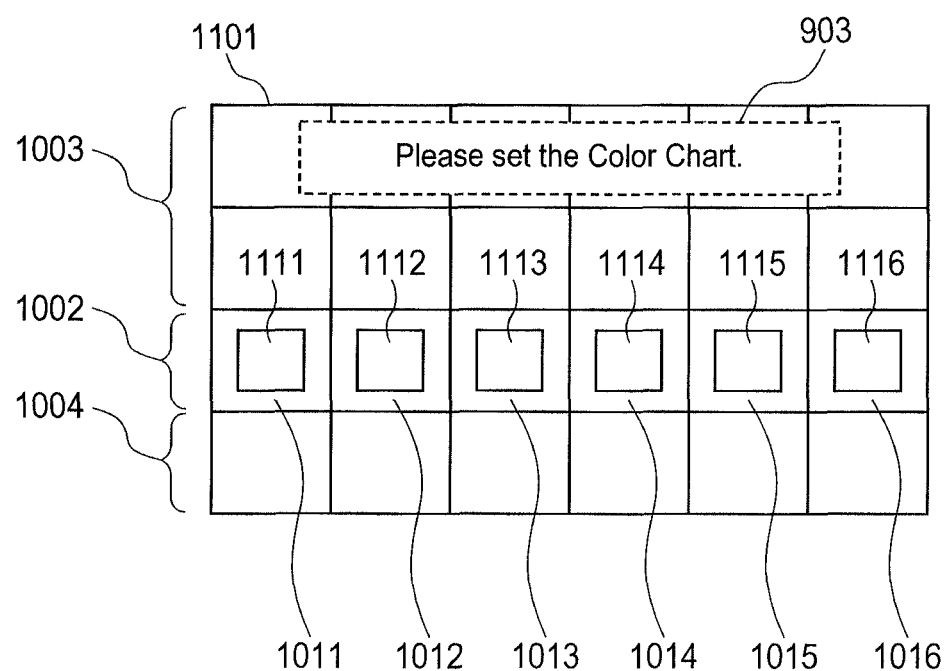
FIG. 11 is a view for describing a field angle adjustment of each TV camera with the color chart according to one embodiment of the present invention.

Next, the field angle adjustment is performed for each of the master 102, the slave 103, and the slave 104. The field angle adjustment will be described with reference to FIG. 11. FIG. 11 is a view for describing the field angle adjustment of the respective TV cameras with the color chart according to one embodiment of the present invention. Numeral 1101 is a displayed image displayed on the display unit such as the viewfinder, and numerals 1111 to 1116 are markers.

In FIG. 11, the field angle adjustment is executed. In order to perform the field angle adjustment, the respective TV cameras (master 102, the slaves 103 and 104) firstly photograph the color chart after the exchange of the reference chart.

For example, a message of "Please set the Color Chart" as in a message 903 in FIG. 11 is displayed, and the field angle of the image of the photographed color chart is adjusted by the operator in such a manner that the frame-like markers 1111 to 1116, which are superimposed on the output signal from the video display apparatus called the viewfinder or from the TV camera, are superimposed on a specific portion (in the case of the color chart, within the area of three primary colors and their complementary colors) of the reference chart. The markers 1111 to 1116 for the field angle adjustment are superimposed only on the picture output of the video display apparatus or CCU (and MCCU), and not superimposed on the main line signal. The signal level of the video signal in the area in the markers 1111 to 1116 is detected so as to execute the later-described video detection process.

After the field angle adjustment, the warning message is not displayed.

Figure 12:
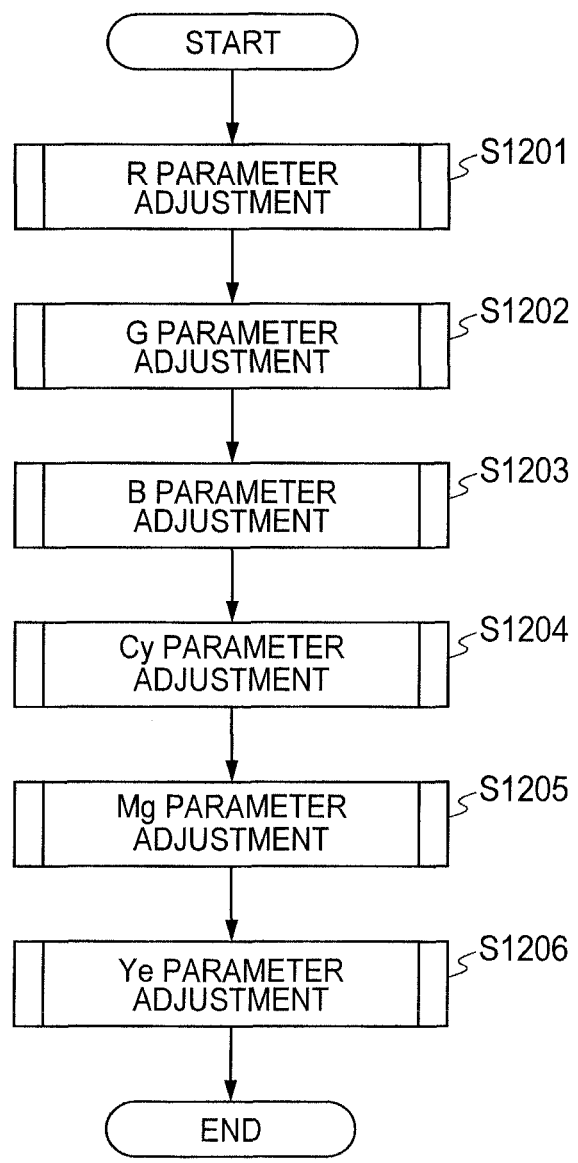
FIG. 12 is a flowchart illustrating a procedure when a masking parameter is adjusted according to one embodiment of the present invention.

In FIG. 12, the master 102 and the slave 103 simultaneously photograph the same color chart, and acquire the resultant as the video signal of the image main line. Then, the field angle is adjusted. Next, the master 102 adjusts later-described six parameters, and outputs the resultant to the FPGA 300 (video detection processing unit 304) of the slave 103 through the transmission line 105, the MCCU 108, the transmission line 111, the CCU 109, the transmission line 106, and the input/output terminal 321.

The masking parameter of the present invention is adjusted with the use of the video signal in the area of the markers 1111 to 1116 during the field angle adjustment.

When the masking parameter is adjusted, the color signal adjustment process is completed.

FIG. 12 is a flowchart illustrating a procedure according to one embodiment of the present invention when the video detection processing unit 304 of the slave adjusts the masking parameter.

Specifically, in FIG. 12, an R (red) parameter is adjusted in step S1201, a G (green) parameter is adjusted in step S1202, and a B (blue) parameter is adjusted in step S1203. A Cy (cyan) parameter is adjusted in step S1204, an Mg (magenta) parameter is adjusted in step S1205, and a Ye (yellow) parameter is adjusted in step S1206.

The processes in steps S1201 to S1206 does not have to be performed in the order in FIG. 12, and they may be performed in random order.

In the processes for the above-mentioned six parameters, the level of the video signal of the master 102 is firstly detected, and the subtraction between the signal level of the video signal and the level of the main line signal is made. Thereafter, when the result of the subtraction becomes lower than a threshold value, the fine adjustment for the subject process is completed.

Steps S1201 to S1206 in FIG. 12 will be described in more detail with reference to FIGS. 13 to 18.

Figure 13:
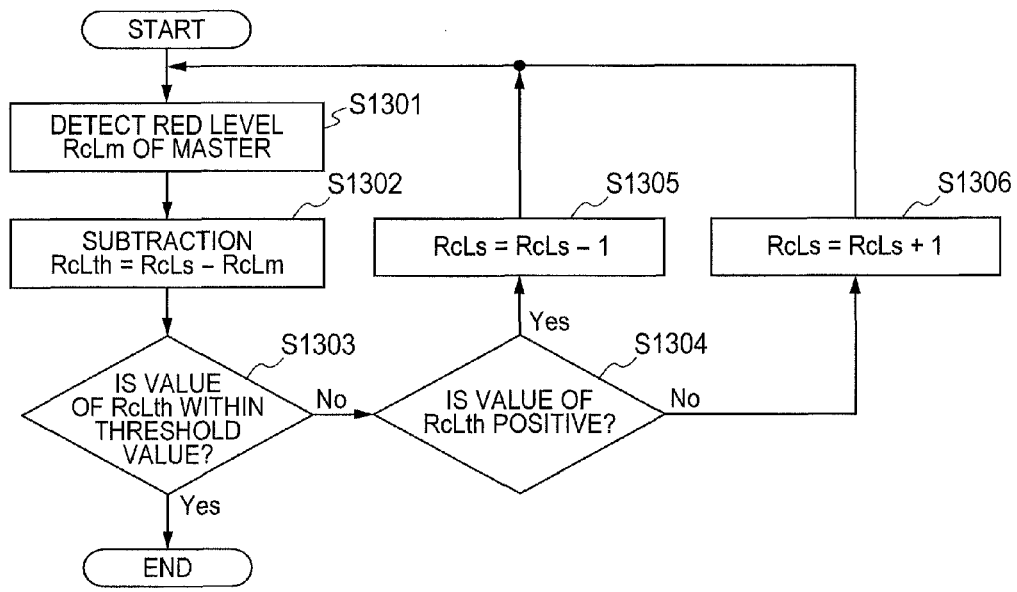
FIG. 13 is a flowchart illustrating a procedure when a red level is adjusted according to one embodiment of the present invention.

The operation of the red level adjustment in step S1201 in FIG. 12 will be described in detail with reference to FIG. 13. FIG. 13 is a flowchart illustrating the procedure when the red level is adjusted according to one embodiment of the present invention.

In step S1301, a red level value RcLm of the video signal of the master 102 inputted to the FPGA 300 is detected, and then, the process proceeds to step S1302.

In step S1302, the video detection processing unit subtracts a red level value RcLm of the video signal of the master 102 from a red level value RcLs of the video signal inputted from the decoder 307 of the slave 103 so as to calculate a subtracted value RcLth, and then, proceeds to step S1303.

In step S1303, it is determined whether the subtracted value RcLth is within a predetermined threshold value of the predetermined red level or not. When the video detection processing unit determines that the subtracted value RcLth is within the predetermined threshold value, it ends the adjustment of the red level, and then, proceeds to step S1202 in FIG. 12. When the video detection processing unit determines that the subtracted value RcLth is outside the predetermined threshold value, it proceeds to step S1304.

In step S1304, it is determined whether the subtracted value RcLth is positive or negative. When the subtracted value RcLth is positive, the video detection processing unit proceeds to step S1305, and when the subtracted value RcLth is negative, it proceeds to step S1306.

In step S1305, the video detection processing unit subtracts 1 from the red level value RcLs of slave 103 (RcLs=RcLs−1), and returns to the process in step S1301.

In step S1306, the video detection processing unit adds 1 to the red level value RcLs of the slave 103 (RcLs=RcLs+1), and returns to the process in step S1301.

Figure 14:
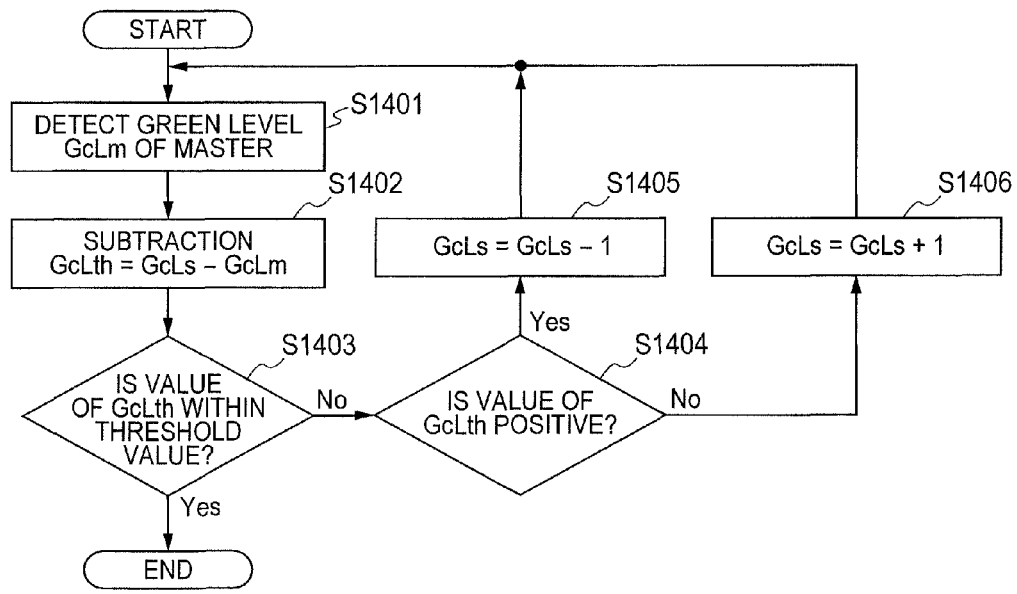
FIG. 14 is a flowchart illustrating a procedure when a green level is adjusted according to one embodiment of the present invention.

The operation of the green level adjustment in step S1202 in FIG. 12 will be described in detail with reference to FIG. 14. FIG. 14 is a flowchart illustrating the procedure when the green level is adjusted according to one embodiment of the present invention.

In step S1401, a red level value GcLm of the video signal of the master 102 inputted to the FPGA 300 is detected, and then, the process proceeds to step S1402.

In step S1402, the video detection processing unit subtracts a green level value GcLm of the video signal of the master 102 from a green level value GcLs of the video signal inputted from the decoder 307 of the slave 103 so as to calculate a subtracted value GcLth, and then, proceeds to step S1403.

In step S1403, it is determined whether the subtracted value GcLth is within a predetermined threshold value of the predetermined green level or not. When the video detection processing unit determines that the subtracted value GcLth is within the predetermined threshold value, it ends the adjustment of the green level, and then, proceeds to step S1203 in FIG. 12. When the video detection processing unit determines that the subtracted value GcLth is outside the predetermined threshold value, it proceeds to step S1404.

In step S1404, it is determined whether the subtracted value GcLth is positive or negative. When the subtracted value GcLth is positive, the video detection processing unit proceeds to step S1405, and when the subtracted value GcLth is negative, it proceeds to step S1406.

In step S1405, the video detection processing unit subtracts 1 from the green level value GcLs of the slave 103 (GcLs=GcLs−1), and returns to the process in step S1401.

In step S1406, the video detection processing unit adds 1 to the green level value GcLs of the slave 103 (GcLs=GcLs+1), and returns to the process in step S1401.

Figure 15:
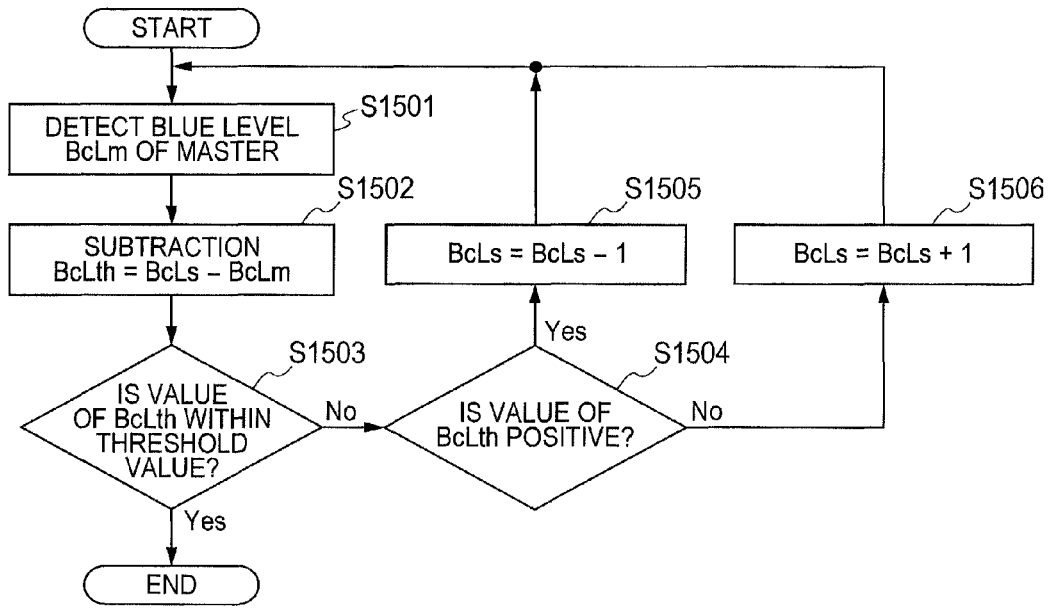
FIG. 15 is a flowchart illustrating a procedure when a blue level is adjusted according to one embodiment of the present invention.

The operation of the blue level adjustment in step S1203 in FIG. 12 will be described in detail with reference to FIG. 15. FIG. 15 is a flowchart illustrating the procedure when the blue level is adjusted according to one embodiment of the present invention.

In step S1501, a blue level value BcLm of the video signal of the master 102 inputted to the FPGA 300 is detected, and then, the process proceeds to step S1502.

In step S1502, the video detection processing unit subtracts a blue level value BcLm of the video signal of the master 102 from a blue level value BcLs of the video signal inputted from the decoder 307 of the slave 103 so as to calculate a subtracted value BcLth, and then, proceeds to step S1503.

In step S1503, it is determined whether the subtracted value BcLth is within a predetermined threshold value of the predetermined blue level or not. When the video detection processing unit determines that the subtracted value BcLth is within the predetermined threshold value, it ends the adjustment of the blue level, and then, proceeds to step S1204 in FIG. 12. When the video detection processing unit determines that the subtracted value BcLth is outside the predetermined threshold value, it proceeds to step S1504.

In step S1504, it is determined whether the subtracted value BcLth is positive or negative. When the subtracted value BcLth is positive, the video detection processing unit proceeds to step S1505, and when the subtracted value BcLth is negative, it proceeds to step S1506.

In step S1505, the video detection processing unit subtracts 1 from the blue level value BcLs of the slave 103 (BcLs=BcLs−1), and returns to the process in step S1501.

In step S1506, the video detection processing unit adds 1 to the blue level value BcLs of the slave 103 (BcLs=BcLs+1), and returns to the process in step S1501.

Figure 16:
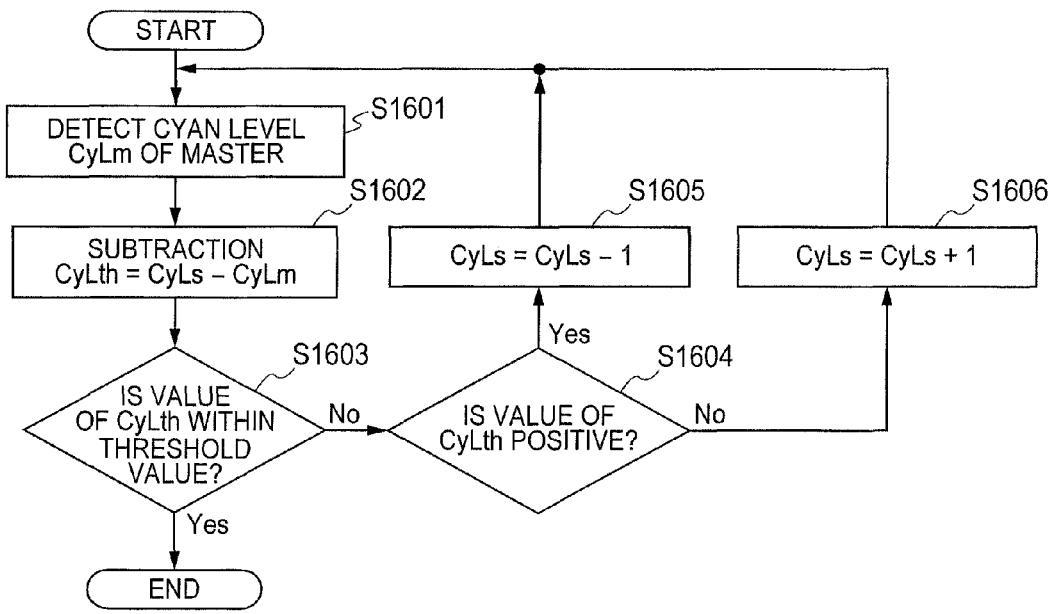
FIG. 16 is a flowchart illustrating a procedure when a magenta level is adjusted according to one embodiment of the present invention.

The operation of the cyan level adjustment in step S1204 in FIG. 12 will be described in detail with reference to FIG. 16. FIG. 16 is a flowchart illustrating the procedure when the cyan level is adjusted according to one embodiment of the present invention.

In step S1601, a cyan level value CyLm of the video signal of the master 102 inputted to the FPGA 300 is detected, and then, the process proceeds to step S1602.

In step S1602, the video detection processing unit subtracts a cyan level value CyLm of the video signal of the master 102 from a cyan level value CyLs of the video signal inputted from the decoder 307 of the slave 103 so as to calculate a subtracted value CyLth, and then, proceeds to step S1603.

In step S1603, it is determined whether the subtracted value CyLth is within a predetermined threshold value of the predetermined cyan level or not. When the video detection processing unit determines that the subtracted value CyLth is within the predetermined threshold value, it ends the adjustment of the cyan level, and then, proceeds to step S1205 in FIG. 12. When the video detection processing unit determines that the subtracted value CyLth is outside the predetermined threshold value, it proceeds to step S1604.

In step S1604, it is determined whether the subtracted value CyLth is positive or negative. When the subtracted value CyLth is positive, the video detection processing unit proceeds to step S1605, and when the subtracted value CyLth is negative, it proceeds to step S1606.

In step S1605, the video detection processing unit subtracts 1 from the cyan level value CyLs of the slave 103 (CyLs=CyLs−1), and returns to the process in step S1601.

In step S1606, the video detection processing unit adds 1 to the cyan level value CyLs of the slave 103 (CyLs=CyLs+1), and returns to the process in step S1601.

Figure 17:
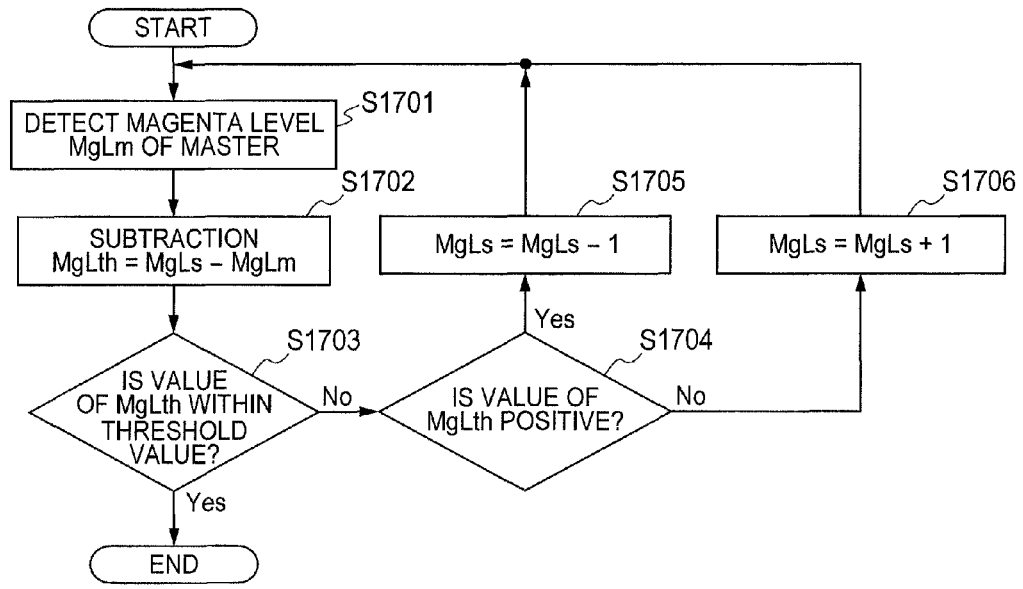
FIG. 17 is a flowchart illustrating a procedure when a cyan level is adjusted according to one embodiment of the present invention.

The operation of the magenta level adjustment in step S1205 in FIG. 12 will be described in detail with reference to FIG. 17. FIG. 17 is a flowchart illustrating the procedure when the magenta level is adjusted according to one embodiment of the present invention.

In step S1701, a magenta level value MgLm of the video signal of the master 102 inputted to the FPGA 300 is detected, and then, the process proceeds to step S1702.

In step S1702, the video detection processing unit subtracts a magenta level value MgLm of the video signal of the master 102 from a magenta level value MgLs of the video signal inputted from the decoder 307 of the slave 103 so as to calculate a subtracted value MgLth, and then, proceeds to step S1703.

In step S1703, it is determined whether the subtracted value MgLth is within a predetermined threshold value of the predetermined magenta level or not. When the video detection processing unit determines that the subtracted value MgLth is within the predetermined threshold value, it ends the adjustment of the magenta level, and then, proceeds to step S1206 in FIG. 12. When the video detection processing unit determines that the subtracted value MgLth is outside the predetermined threshold value, it proceeds to step S1704.

In step S1704, it is determined whether the subtracted value MgLth is positive or negative. When the subtracted value MgLth is positive, the video detection processing unit proceeds to step S1705, and when the subtracted value MgLth is negative, it proceeds to step S1706.

In step S1705, the video detection processing unit subtracts 1 from the magenta level value MgLs of the slave 103 (MgLs=MgLs−1), and returns to the process in step S1701.

In step S1706, the video detection processing unit adds 1 to the magenta level value MgLs of the slave 103 (MgLs=MgLs+1), and returns to the process in step S1701.

Figure 18:
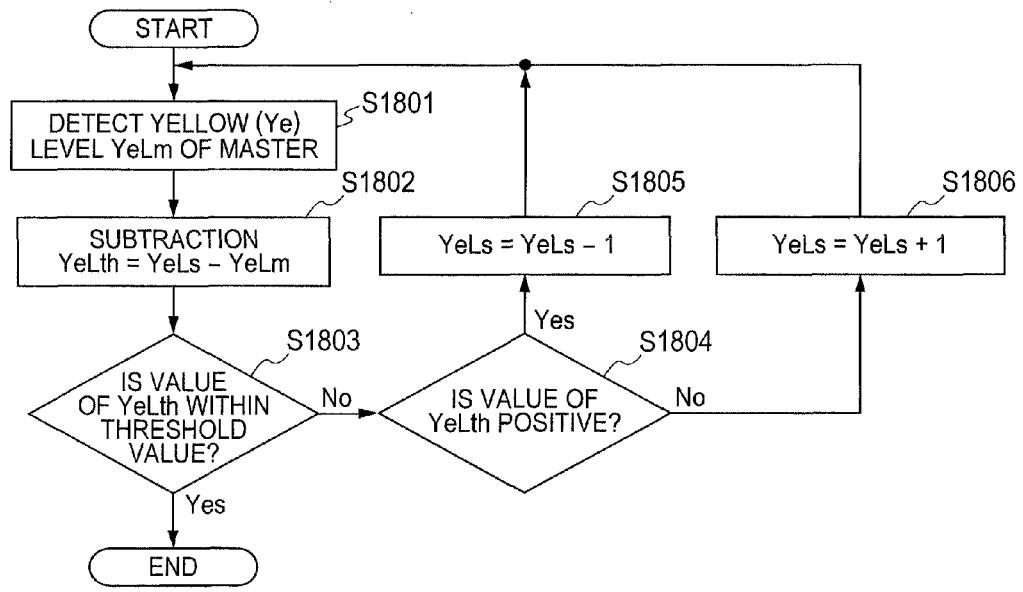
FIG. 18 is a flowchart illustrating a procedure when a yellow level is adjusted according to one embodiment of the present invention.

The operation of the yellow level adjustment in step S1206 in FIG. 12 will be described in detail with reference to FIG. 18. FIG. 18 is a flowchart illustrating the procedure when the yellow level is adjusted according to one embodiment of the present invention.

In step S1801, a yellow level value YeLm of the video signal of the master 102 inputted to the FPGA 300 is detected, and then, the process proceeds to step S1802.

In step S1802, the video detection processing unit subtracts a yellow level value YeLm of the video signal of the master 102 from a yellow level value YeLs of the video signal inputted from the decoder 307 of the slave 103 so as to calculate a subtracted value YeLth, and then, proceeds to step S1803.

In step S1803, it is determined whether the subtracted value YeLth is within a predetermined threshold value of the predetermined yellow level or not. When the video detection processing unit determines that the subtracted value YeLth is within the predetermined threshold value, it ends the adjustment of the magenta level, and then, proceeds in FIG. 12. When the video detection processing unit determines that the subtracted value YeLth is outside the predetermined threshold value, it proceeds to step S1804.

In step S1804, it is determined whether the subtracted value YeLth is positive or negative. When the subtracted value YeLth is positive, the video detection processing unit proceeds to step S1705, and when the subtracted value YeLth is negative, it proceeds to step S1806.

In step S1805, the video detection processing unit subtracts 1 from the yellow level value YeLs of the slave 103 (YeLs=YeLs−1), and returns to the process in step S1801.

In step S1806, the video detection processing unit adds 1 to the yellow level value YeLs of the slave 103 (YeLs=YeLs+1), and returns to the process in step S1801.

According to the embodiment described above, the time taken for the color registration among the TV cameras can remarkably be shortened. The adjustment can easily be automated. Further, the variation in the color signal adjustment among the TV cameras is reduced.

Moreover, the color signal adjustment among the TV cameras can easily and quickly be realized without relying on the level of the skill the operator.

The fine adjustment process according to one embodiment of the present invention has been described above with reference to FIGS. 1 to 18. Next, another embodiment of the present invention will be described with reference to the flowchart in FIG. 19. In the embodiment in FIG. 19, step S1901 in FIG. 19 is added after the fine adjustment with the grayscale chart in FIG. 4.

Specifically, in addition to the fine adjustment process of the black level, the gain level (white level), the flare level, and the gamma level, a knee level is adjusted by using the grayscale chart. After this adjustment, the fine adjustment process for the masking is executed based upon the video signal obtained by photographing the color chart.

FIG. 4 is the flowchart illustrating the procedure according to one embodiment of the present invention, when the video detection processing unit 304 of the slave adjusts the black level, the gain level (white level), the flare level, and the gamma level. The parameters adjusted with the use of the grayscale chart 101 as the reference chart are the above-mentioned five parameters excluding the masking.

Figure 19:
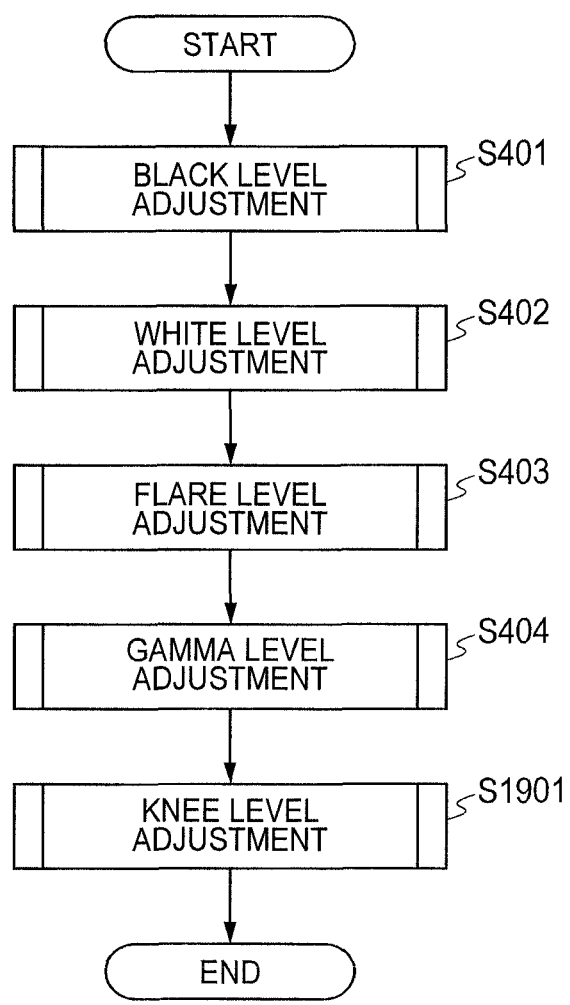
FIG. 19 is a flowchart illustrating a procedure when a black level, a gain level, a flare level, a gamma level, and a knee level are adjusted according to one embodiment of the present invention.

According to the embodiment illustrated in FIG. 19, the knee characteristic can also be adjusted. Therefore, this embodiment can reduce the variation in the color signal adjustment in addition to the effect in FIGS. 1 to 18.

Another embodiment of the present invention will be described with reference to FIG. 20.

Figure 20:
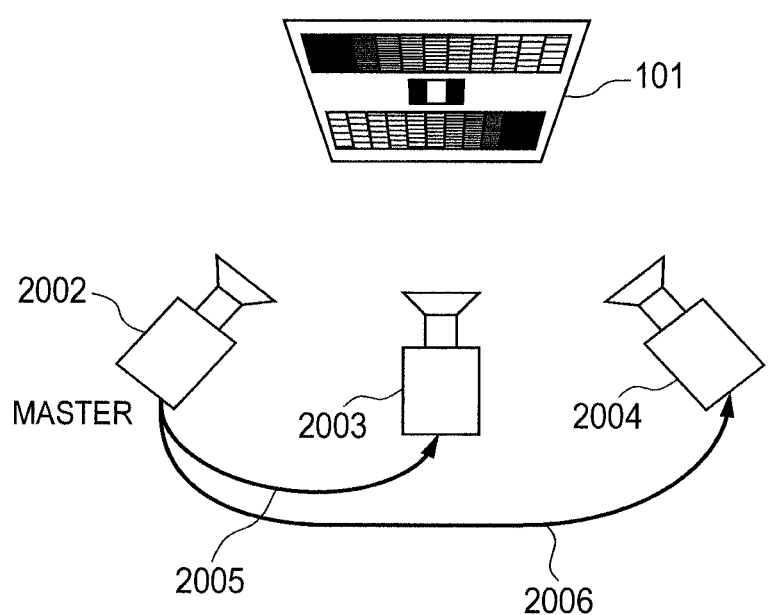
FIG. 20 is a block diagram illustrating a configuration of a TV camera control system according to one embodiment, when a color signal adjustment operation according to the present invention is performed.

FIG. 20 is a block diagram illustrating a configuration of a TV camera control system according to one embodiment, when the color signal adjusting operation according to the present invention is executed. Numeral 2002 is a master, and numerals 2003 and 2004 are slaves. Numerals 2005 and 2006 are transmission lines such as a coaxial cable.

The embodiment with reference to FIGS. 1 to 18 describes the example of the system operation for connecting the camera control apparatus (MCCU, CCU) and the TV camera. However, the present invention is applicable to the operation using only the TV camera. FIG. 20 illustrates the example of the application of the present invention to the case where only the TV camera is used.

In FIG. 20, an output signal from the master 2002 is inputted to the slaves 2003 and 2004 via the transmission lines 2005 and 2006. Thereafter, each of the slaves 2003 and 2004 makes a setting of its TV camera body based upon various set data extracted from the output signal from the master 2002 so as to perform the above-mentioned processes (black, gain level, flare level, gamma level, knee level, and masking).

As described above, one embodiment of the present invention is a television camera that performs spectroscopy to a subject image that is incident through a lens unit, and irradiates the resultant to a solid-state imaging device so as to convert the resultant to a video signal, wherein a video signal, which is formed by multiplexing signals of each of red, green, and blue channels, is inputted, the signals being subject to a color signal adjustment, and the color signal adjustment is performed to agree with the value of the inputted video signal.

Preferably, the television camera photographs a reference chart, which is photographed by the television camera that is defined as the reference for the color signal adjustment for performing the color signal adjustment, simultaneous with the television camera, and performs the color signal adjustment to agree with the value of the inputted video signal. More preferably, predetermined plural reference areas are formed on the reference chart, wherein the photographed position of the area is adjusted to agree with a position of a predetermined marker, whereby a field angle is adjusted such that the field angle agrees with the field angle of the television camera, which is defined as the reference for the color signal adjustment, and then, the color signal adjustment is performed.

More preferably, the television camera inputs the video signal, which is formed by multiplexing the signals of each of red, green, and blue channels, the signals being subject to the color signal adjustment, from the television camera that is defined as the reference for the color signal adjustment in the form of HD-SDI (High Definition Television-Serial Digital Interface).

One embodiment of the present invention is a television camera control system including a first television camera that photographs a reference chart, adjusts a field angle to a predetermined field angle, and adjusts a black level, a white level (gain level), a flare level, a gamma (γ) level, and a color difference matrix; a transmission line; and a second television camera that photographs the reference chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, and a color difference matrix.

Preferably, when the first television camera is used in combination with a camera control apparatus, the video signal inputted to the second television camera through the transmission line is a return signal of a camera control apparatus of the first television camera.

Preferably, the transmission line is an HD-SDI (High Definition Television-Serial Digital Interface) signal.

One embodiment of the present invention is a television camera control system including a first television camera that photographs a reference chart, adjusts a field angle to a predetermined field angle, and adjusts a black level, a white level (gain level), a flare level, a gamma (γ) level, a knee, and a color difference matrix; a transmission line; and a second television camera that photographs the reference chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, a knee, and a color difference matrix.

Preferably, when the first television camera is used in combination with a camera control apparatus, the video signal inputted to the second television camera through the transmission line is a return signal of a camera control apparatus of the first television camera.

Preferably, the transmission line is an HD-SDI (High Definition Television-Serial Digital Interface) signal.

The present invention has been described in detail with reference to the embodiments. However, the present invention is not limited to the above-mentioned embodiments, and the present invention naturally includes an invention that can modify and change the present invention based upon the scope and spirit of the present invention by a person skilled in the technical field to which the present invention belongs.

REFERENCE SIGNS LIST

100 Studio
101 Grayscale chart
102 Master
103, 104 Slave
105, 106, 107 Transmission line
108 MCCU
109, 110 CCU
111, 112 Transmission line
120 Adjustment room
200 Displayed image
201 to 207 Marker
300 FPGA
301 Serial-parallel converter
302 Decoder
303 Data separation unit
304 Video detection processing unit
305 Video signal processing unit
306 Matrix unit
307 Decoder
308 Color signal generating unit
309 CPU data superimposition unit
310 Parallel-serial converter
311 Marker superimposition unit 312 Color signal generating unit
313 Parallel-serial converter
314 Three-value synchronized mixing unit
321 Input/output terminal
331 HD-SDI signal output terminal
341 CPU
342 Timing generator
343 Analog front end
344 CCD
345 Lens unit
350 Viewfinder
351 D-A converter
901 Display screen
902, 903 Warning message
Display screen
1002 Line of intermediate color
1003 Line of grayscale
1004 Blue
1005 Green
1006 Red
1007 Yellow
1008 Magenta
1009 Cyan
1101 Display screen
2002 Master
2003, 2004 Slave
2005, 2006 Transmission line

The invention claimed is:

1. A television camera control system comprising: a first television camera that photographs a grayscale chart, adjusts a field angle to a predetermined field angle, and adjusts a black level, a white level (gain level), a flare level, a gamma ($\gamma$) level, and a color difference matrix; a transmission line; and a second television camera that photographs the grayscale chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, and a color difference matrix.

2. A television camera control system comprising: a first television camera that photographs a grayscale chart, adjusts a field angle to a predetermined field angle, and adjusts a black level, a white level (gain level), a flare level, a gamma ($\gamma$) level, a knee, and a color difference matrix; a transmission line; and a second television camera that photographs the grayscale chart simultaneous with the first television camera, adjusts a field angle to the predetermined angle, and adjusts an image level of a video signal of the second television camera in order that a video signal inputted from the first television camera through the transmission line and the inputted video signal agree with each other, thereby adjusting a black level, a white level, a flare level, a gamma level, a knee, and a color difference matrix.

* * * * *